United States Patent [19]

Craig et al.

[11] Patent Number: 4,650,399
[45] Date of Patent: Mar. 17, 1987

[54] ROTOR BLADE FOR A ROTARY MACHINE

[75] Inventors: Harold M. Craig; Ernest Feder, both of West Hartford, Conn.

[73] Assignee: United Technologies Corporation, Hartford, Conn.

[21] Appl. No.: 669,560

[22] Filed: May 7, 1984

Related U.S. Application Data

[62] Division of Ser. No. 388,349, Jun. 14, 1982, Pat. No. 4,501,053.

[51] Int. Cl.⁴ .............................................. F01D 5/18
[52] U.S. Cl. ........................... 416/97 R; 416/96 A; 416/193 A; 416/214 A; 416/248
[58] Field of Search .......... 416/96 A, 96 R, 248, 416/193 A, 214 A, 92, 97 R, 239, 241 B

[56] References Cited

U.S. PATENT DOCUMENTS

| | | | |
|---|---|---|---|
| 2,641,440 | 6/1953 | Williams | 416/96 X |
| 2,719,431 | 3/1973 | Steele et al. | 416/96 |
| 2,819,870 | 1/1958 | Wayne | 416/248 |
| 2,858,102 | 10/1958 | Bloomberg | 416/92 |
| 2,931,621 | 4/1960 | O'Donnell | 416/214 A X |
| 3,567,333 | 3/1971 | DeFeo | 416/90 |
| 3,635,587 | 1/1972 | Giesman et al. | 416/96 A X |
| 3,647,316 | 3/1972 | Moskowitz | 416/96 A X |
| 3,732,031 | 5/1973 | Bowling et al. | 416/96 A X |
| 4,183,716 | 1/1980 | Takahara et al. | 416/96 A |
| 4,257,737 | 3/1981 | Andress et al. | 416/97 R |

FOREIGN PATENT DOCUMENTS

| | | | |
|---|---|---|---|
| 204382 | 7/1956 | Australia | 416/193 A |
| 924248 | 2/1955 | Fed. Rep. of Germany | 416/92 |
| 969414 | 12/1950 | France | 416/92 |
| 1007303 | 5/1952 | France | 419/97 R |
| 109703 | 8/1980 | Japan | 416/96 A |
| 79007 | 5/1984 | Japan | 416/248 |

Primary Examiner—Everette A. Powell, Jr.
Attorney, Agent, or Firm—Gene D. Fleischhauer

[57] ABSTRACT

A rotor blade 14 having a spar 138 and shell 134 is disclosed. Various construction details are developed for efficiently transferring rotational loads on the rotor blade to the root section 28 of the spar. The spar has a projection 139 over which extends a portion 100 of the shell and a platform 36 of the rotor blade.

7 Claims, 6 Drawing Figures

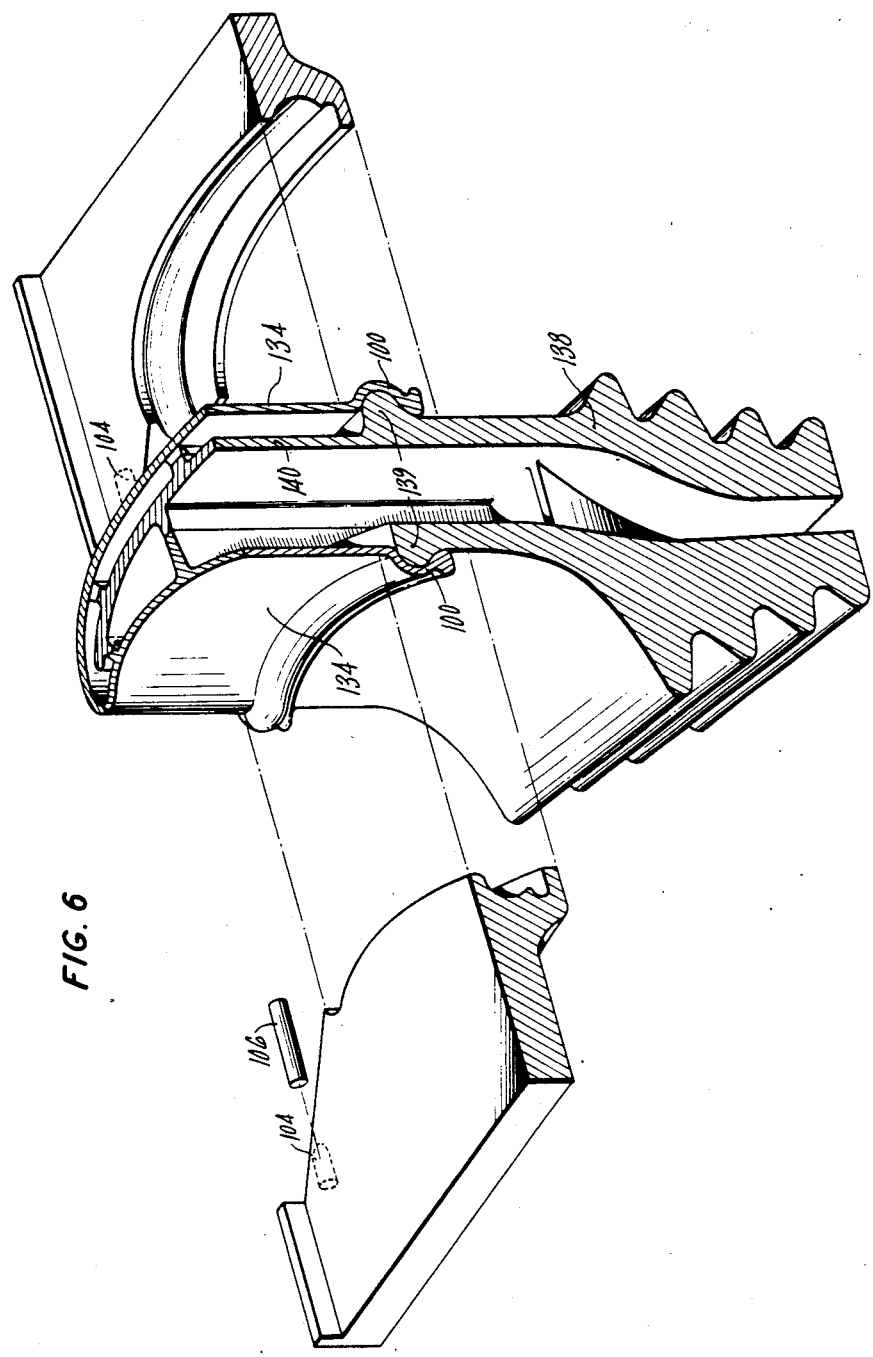

ROTOR BLADE FOR A ROTARY MACHINE

CROSS REFERENCE TO RELATED APPLICATION

This is a division of U.S. application Ser. No. 388,349 filed on June 14, 1982 and issued on Feb. 26, 1985 as U.S. Pat. No. 4,501,053. cl TECHNICAL FIELD This invention relates to rotor blades used in rotary machines. Although the concepts were developed in the axial flow gas turbine engine field, the concepts have application to other constructions of rotor blades.

BACKGROUND ART

Axial flow gas turbine engines include a compression section, a combustion section and a turbine section. A flow path for working medium gases extends axially through these sections of the engine. The working medium gases are compressed in the compression section and burned with fuel in the combustion section to add energy to the gases. The hot, high pressure gases are expanded through the turbine section to produce useful work.

Rotor assemblies extend axially through the engine to transfer the energy required for compressing the working medium gases from the turbine section to the compression section. The rotor assembly in the turbine section includes one or more rotor disks. An array of rotor blades attached to the rotor disk extends outwardly from the disk across the working medium flow path. As the hot working medium gases are flowed through the turbine section of the machine, the gases exert a force on the rotor blades driving the array of rotor blades and the rotor disk at high speeds about the axis of rotation. The high speed rotation of each rotor disk and array of rotor blades imposes operating stresses on the rotor blades and the rotor disk. These stresses are especially severe in the disk near the root region of the rotor blade where the root engages a corresponding slot in the disk.

In addition to the stresses caused by the rotational forces, the airfoil section of each rotor blade is bathed in the hot working medium gas causing thermal stresses in the airfoils which affect the structural integrity and fatigue life of the airfoil. These thermal stresses have been a source of concern since the introduction of gas turbine engines because of the need to operate the engines at high temperatures to maximize engine efficiency. For example, the airfoils in the turbines of such engines may see temperatures in the working medium gases as high as twenty-five hundred degrees Fahrenheit (2500° F.). The blades of these engines are typically cooled to preserve the structural integrity and the fatigue life of the airfoil by reducing the level of thermal stresses in the airfoil.

One early approach to airfoil cooling is shown in U.S. Pat. No. 2,648,520 issued to Schmitt entitled "Air Cooled Turbine Blade". Schmitt shows a coolable rotor blade. A shell defines the airfoil surface. The rotor blade has a core to support the shell and filler material to provide a heat transfer surface between the core and the shell. Cooling air is flowed through the blade to cool the blade and receives heat from the shell and from the filler material.

A later approach employed transpiration cooled turbine blades such as are shown in U.S. Pat. No. 3,067,982 entitled "Porous Wall Turbine Blades and Method of Manufacture" issued to Wheeler; U.S. Pat. No. 3,402,913 entitled "Method of Controlling The Permeability Of A Porous Material and Turbine Blade Formed Thereby" issued to Kump et al.; and U.S. Pat. No. 3,567,333 entitled "Gas Turbine Blade" issued to DeFeo. As shown in these patents, transpiration cooling is provided by flowing cooling air through a porous shell of the rotor blade. As in the early Schmitt patent, an inner core or strut is provided to support the porous shell.

U.S. Pat. No. 4,033,792 entitled "Composite Single Crystal Article" issued to Giamei discloses a coolable rotor blade having an inner core and airfoil elements which are supported by the core to form an aerodynamic flow directing surface. The core element has two passages for a cooling fluid. The inner core material is selected for high temperature strength. The airfoil material is selected for oxidation and corrosion resistance. The rotor blade is made by inserting the core and the airfoil elements into a recess in a base member and bonding together the core, the airfoil elements, and the base member.

As time passed more sophisticated approaches were developed for cooling the rotor blade. One of these approaches employed a one-piece casting having tortuous cooling air passages. Such a rotor blade is exemplified in the structure shown in U.S. Pat. No. 4,073,599 entitled "Hollow Turbine Blade Tip Closure" issued to Allen et al. Allen et al. discloses the use of intricate cooling passages coupled with other techniques to cool the airfoil. For example, the leading edge region in Allen is cooled by impingement cooling followed by the discharge of the cooling air through a spanwisely extending passage in the leading edge region of the blade.

The cooling of turbine airfoils using intricate cooling passages is the subject of many of the latest patents such as: U.S. Pat. No. 4,177,010 issued to Greaves et al. entitled "Cooling Rotor Blade For A Gas Turbine Engine"; U.S. Pat. No. 4,180,373 issued to Moore et al. entitled "Turbine Blade"; U.S. Pat. No. 4,224,011 issued to Dodd et al. entitled "Cooled Rotor Blade For A Gas Turbine Engine"; and U.S. Pat. No. 4,278,400 issued to Yamarik et al. Entitled "Coolable Rotor Blade". These rotor blades are typified by cooling air passages having dimensions which are many times greater than the thickness of the walls of the airfoil of the blade.

The orientation of the coolable airfoil of the rotor blade to the approaching working medium gases is constrained by aerodynamic considerations. These aerodynamic considerations require orienting the airfoil with respect to the approaching flow to remove the right amount of work from the approaching flow and to redirect the flow to the next array of airfoils in an efficient manner. The root of the rotor blade is oriented with respect to the airfoil to ensure that acceptable levels of stress are not exceeded in the critical transition region between the airfoil and the root of the rotor blade. Significant stress concentrations do occur in this region because of the transition from an elongated thin plate (airfoil) to the shorter, broader plate (root) which engages the rotor disk.

In modern gas turbine engines, the root is typically angled with respect to the axis of rotation to more closely align the root to the airfoil to reduce these stress concentrations. Because the orientation of the root is constrained by the orientation of the airfoil, the root is not optimally oriented with respect to the disk but rather is angled with respect to the face of the disk. This angles the slot in the disk with respect to the axis of rotation of the disk and results in the rotor blade exerting a twisting force which imposes a bending moment on the periphery of the disk. As a result, the stresses on one side of the slot in the disk are high at the leading edge of the disk and low at the trailing edge whereas on the opposite side of the slot the stresses are high at the trailing edge and low at the leading edge. A rotor blade disposed in a slot which is parallel to the axis of rotation does not exert such severe twisting forces on the disk and accordingly, the rotational load results in a uniform level of stress in the disk. It has long been recognized that slots in the disk which are substantially parallel to the axis of rotation result in a relatively uniform rotational stress in the disk thereby reducing the maximum level of stress in the rim of the disk and enable either a greater fatigue life in the disk or a disk of lighter weight. Nevertheless, the slots in the disk have typically been angled with respect to the axis of rotation because of the considerations of fatigue life in the rotor blade.

Any slot which extends across the disk destroys the hoop strength of the rim of the disk by interrupting the circumferential continuity of the rim. As a result, the disk material between slots cannot support itself against rotational forces. A circumferentially continuous hoop of material inwardly of the interrupted hoop is provided by the disk to support the material between the slots. The interrupted hoop of material between the slots is referred to as the "dead rim" of the disk. The weight of the rotor assembly beyond the continuous hoop is referred to as the "dead rim weight".

The disk is typically formed of high strength material such as nickel and cobalt base superalloys. These superalloys have the necessary strength to support the dead rim weight and the weight of the material which forms the remainder of the disk. The strength of these superalloys peaks at a temperature well below the temperature of the working medium gases and decreases as the temperature of the alloy is raised above the peak.

Rotor blades designed for use with high temperature working medium gases have a platform which blocks the transfer of heat from the hot, working medium gases to the disk. Although the platform performs this useful function, the weight of the platform increases the dead rim weight of the disk causing an increase in the level of stresses or an increase in the size of the disk for the same fatigue life.

Accordingly, scientists and engineers are working to develop a rotor blade which orients the root of the blade more parallel to the axis of rotation of the disk than was permitted by the prior art designs to reduce stress concentrations in the disk, which has an airfoil which satisfies stress and aerodynamic demands placed on the rotor blade and which has a platform for shielding the disk and the root of the rotor blade from the hot working medium gases without compromising the structural integrity of the overall design.

DISCLOSURE OF INVENTION

According to the present invention, a rotor blade has a spar having a root and an airfoil section, a shell for the airfoil which is attached to the airfoil section of the spar to transfer rotational loads of the shell through the airfoil section to the root, and a platform which is attached to the spar and which extends over a portion of the shell.

In accordance with the present invention, a method for making a rotor blade having a shell and spar construction includes the steps of attaching a shell to a spar having a root and an airfoil section at the airfoil section of the spar and attaching a platform to the spar such that it extends over a portion of the shell.

In accordance with one embodiment of the present invention, the spar, shell and platform parts of the rotor blade are formed of different materials to match the critical properties of the materials to the function performed by the parts.

A primary feature of the present invention is a rotor blade. The rotor blade has a spar. The spar has an airfoil section and a root section. The root section forms the root of the rotor blade. Another feature is a shell spaced from the airfoil section of the spar. A plurality or ribs extend between the shell and the spar. A platform attached to the spar extends over a portion of the shell. In one embodiment the spar has a projection which extends circumferentially about the spar. The platform extends over the projection and extends between the root and shell. In another embodiment, a portion of the shell extends over the projection on the spar and the platform extends over both the projection and the shell. In one embodiment a conical chord line extending between the leading edge and the trailing edge forms an acute angle with the axis of symmetry of the rotor blade which is greater than twenty degrees (20°). In one embodiment, the ribs extend substantially perpendicular to the axis of rotation of the rotor blade and have a ratio of average length to width which is greater or equal to three ($1/W \geq 3$) and a width which is approximately the width of the spar.

A principal advantage of the present invention is the fatigue life and weight of a rotor blade owing to the method of assembly which enables a multi-part blade formed of different materials. Another advantage of the present invention is the fatigue life of the rotor blade owing to the level of stress in the transition region between the root and airfoil which results from taking rotational forces on the shell out through the airfoil section of the spar. An advantage is the structural integrity of the blade which results from forming the platform about the spar and the airfoil section. In one embodiment, an advantage is the fatigue life which results from attaching the shell to the airfoil section of the spar and trapping the base of the shell between the platform and the projection on the spar. Still another advantage is the light weight and rigidity of the hollow beam construction of the airfoil owing to the flat plate construction provided by ribs having a ratio of length to average width in the base region of the blade which is greater than or equal to three.

The foregoing features and advantages of the present invention will become more apparent in the light of the following detailed description of the best mode for carrying out the invention and in the accompanying drawings.

BRIEF DESCRIPTION OF DRAWINGS

FIG. 6 is an exploded partial perspective view of an alternate embodiment of the rotor blade shown in FIG. 3.

BEST MODE FOR CARRYING OUT INVENTION

Figure 1:
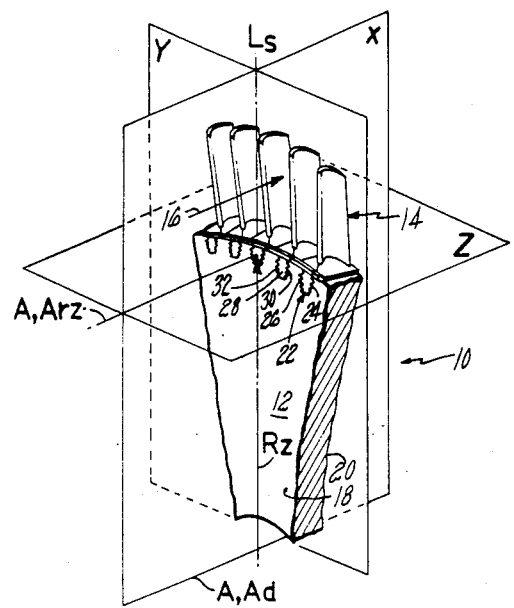
FIG. 1 is a partial perspective view of the rotor assembly of an axial flow gas turbine engine.

A gas turbine engine embodiment of an axial flow rotary machine is illustrated in the FIG. 1 partial perspective view. A portion of a rotor assembly 10 of the engine is shown. The rotor assembly includes a rotor disk 12 having an axis of symmetry $A_d$, an axis of rotation A and a plurality of rotor blades 14 extending outwardly from the disk. A flow path 16 for working medium gases extending through the rotor assembly passes between adjacent rotor blades.

The disk 12 has a leading edge surface 18 and a trailing edge surface 20. The disk is adapted to receive the rotor blades 14 by a plurality of slots 22 extending from the leading edge surface to the trailing edge surface. Each slot is bounded by a pressure sidewall 24 and a suction sidewall 26. The sidewalls are perpendicular to the leading edge and trailing edge surfaces of the disk. Each rotor blade is adapted by a root 28 to engage the disk. The root has a pressure sidewall 30 and a suction sidewall 32 each conforming to a sidewall of the disk.

The dimensions of the rotor blade are measured from a reference X-plane, a reference Y-plane and a reference Z-plane. In the installed condition, these reference planes have a particular orientation with respect to the axis of rotation A and the axis of symmetry $A_d$ of the rotor disk 12. The reference X-plane extends in an axial direction and contains the axes $A_x$, A. The reference Y-plane is a radial plane perpendicular to the axes $A_d$, A. The X-plane and the Y-planes extend in the spanwise direction of the rotor blade and intersect along a reference line $L_s$. The reference Z-plane extends in the chordwise direction of the rotor blade, is perpendicular to both the X and Y planes, and is a tangent plane at an arbitrary radius $R_z$ from the axis of rotation A. The X, Y, and Z planes remain with the blade in its uninstalled condition. An axis of symmetry of the root $A_r$ of the blade lies midway between the suction sidewall and the pressure sidewall of the rotor blade. Each axis of symmetry is parallel to the sidewalls of the blades. For example, the axis of symmetry $A_{rz}$ of the root of the rotor blade lies on the radius $R_z$ at the radius $R_z$. Other axes of symmetry of the root are parallel to the axis of symmetry $A_{rz}$.

Figure 2:
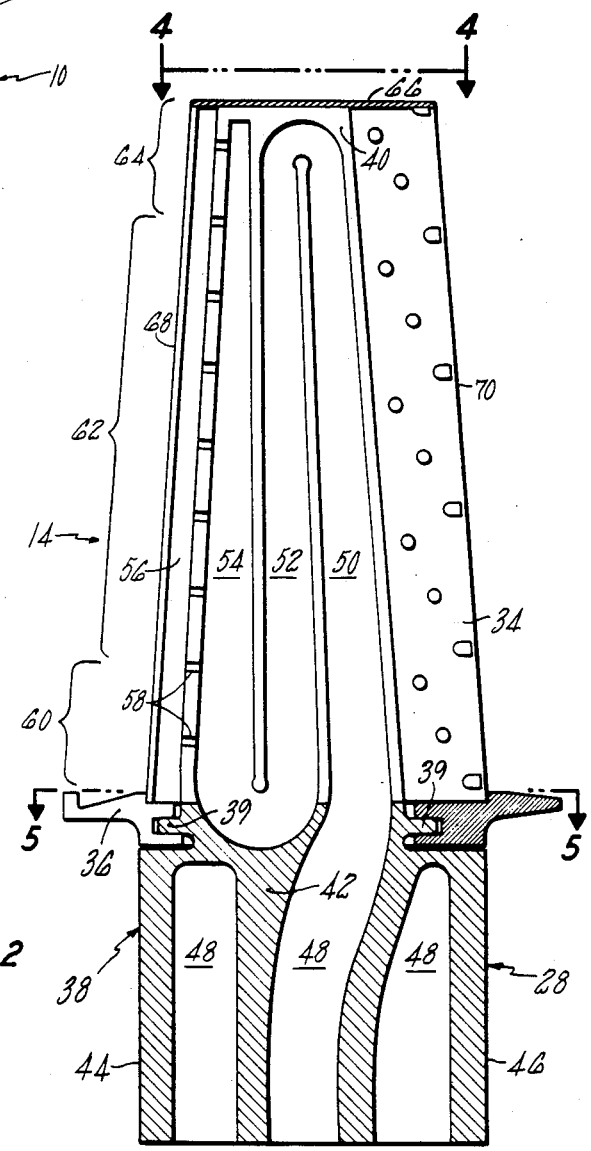
FIG. 2 is a side elevation view of the rotor blade of the rotor assembly with a portion of the rotor blade broken away to show the interior of the blade.

FIG. 2 is a side elevation view of the rotor blade 14 with a portion of the rotor blade broken away to show the interior of the blade. The rotor blade includes a shell 34, a platform 36 and a spar 38. The spar is formed of a first material such as MAR-M-246, a commercially available nickel-base superalloy available from the Martin Metals Corporation. A projection 39 on the spar extends chordwisely about the spar. The spar has an airfoil section 40 and a root section 42. The root section forms the root 28 of the rotor blade. The root has a leading edge surface 44 and a trailing edge surface 46. The leading edge surface of the root section is parallel to the leading edge surface 18 of the disk and is perpendicular to the sidewalls of the root. The trailing edge surface of the root section is parallel to the trailing edge surface 20 of the disk and perpendicular to the sidewalls of the root. A cooling air passage 48 extends through the root section of the spar. The cooling air passage 48 is in flow communication with a cooling air supply passage in the disk (not shown). The cooling air passage 48 is in flow communication with cooling air passages 50, 52, 54 and 56 in the airfoil section of the spar. A plurality of impingement holes 58 place the cooling air passage 54 in flow communication with the passage 56 for cooling air.

The shell 34 has a base region 60, a midspan region 62 and a tip region 64. A tip cap 66 provides a closure to the shell. The tip cap may be integrally formed with the shell or bonded to the shell by a suitable process such as diffusion bonding, welding or the like. The shell has a leading edge 68 and a trailing edge 70. The shell is formed of a second material such as IN-100 a commercially available nickel-base superalloy available from the International Nickel Corporation, or any other suitable alloy having a good resistance to corrosion as set forth in the Materials Engineering publication, 1981 *Materials Selector* published by Penton/IPC, a subsidiary of the Pittway Corporation, Cleveland, Ohio.

Figure 3:
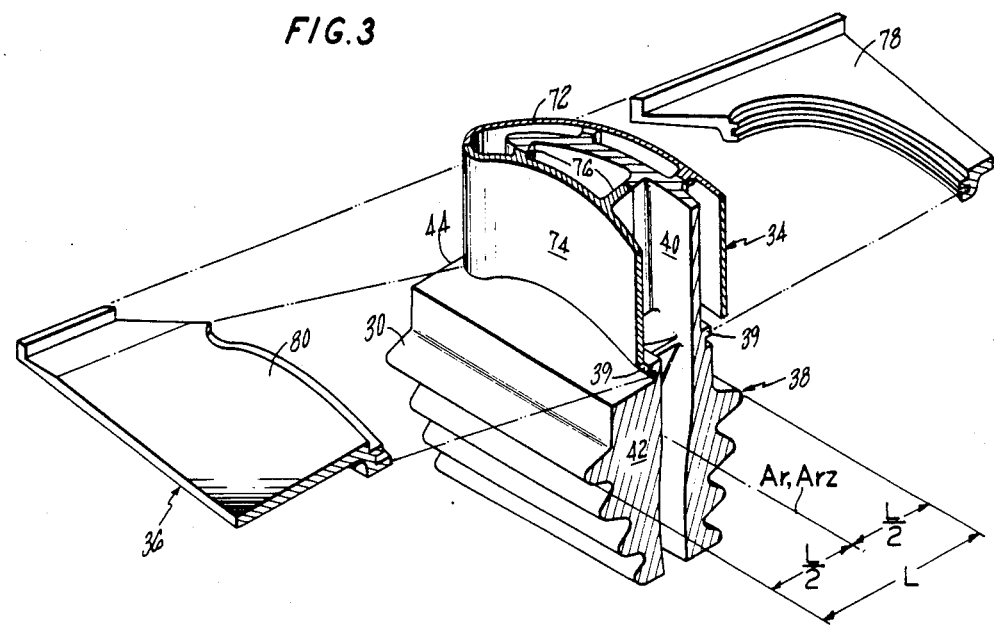
FIG. 3 is an exploded partial perspective view of the rotor blade shown in FIG. 2 with portions of the shell, the platform and the spar broken away.

FIG. 3 is an exploded partial perspective view of the rotor blade 14 with portions of the shell 34, the platform 36, and the spar 38 broken away for clarity. FIG. 3 shows more clearly the relationship between the shell 34, the platform 36, and the airfoil section 40 of the spar. The shell is spaced chordwisely from the airfoil section and spanwisely from the root 42 of the spar. The shell 34 has a suction sidewall 72 and a pressure sidewall 64. A plurality of ribs 76 extend between the sidewalls of the shell and airfoil section of the spar. The sidewalls of the shell are attached one to the other and to the spar by brazing, welding, diffusion bonding or a like process.

The platform 36 extends between the sidewalls of the shell 34 and the spar 38 to block the leakage of cooling air from the interior of the rotor blade during operation of the rotor assembly. The platform extends over a portion of the shell; and is attached to the spar. The platform has a suction side portion 78 and a pressure side portion 80. Each portion is formed of a ceramic composite such as the ceramic composite described in U.S. Pat. No. 4,324,843 entitled "Continous Length Silicon Carbide Fiber Reinforced Ceramic Composites" issued to Brennan et al. The two portions are bonded together to form a single structure. Alternatively, the platform might be cast directly around the shell and the root. A ceramic composite might be used as described in U.S. Pat. No. 4,324,843 because the ceramic composite is immiscible with respect to the materials of the spar, the platform is mechanically attached to the spar. A metallic alloy might be used as described in U.S. Pat. No. 4,008,052 entitled "Method For Improving Metallurgical Bond in Bimetallic Castings" issued to Vishnevsky et al. A more detailed discussion of the method for forming the platform about the shell and root is presented with the discussion of the FIG. 6 alternate embodiment.

Figure 4:
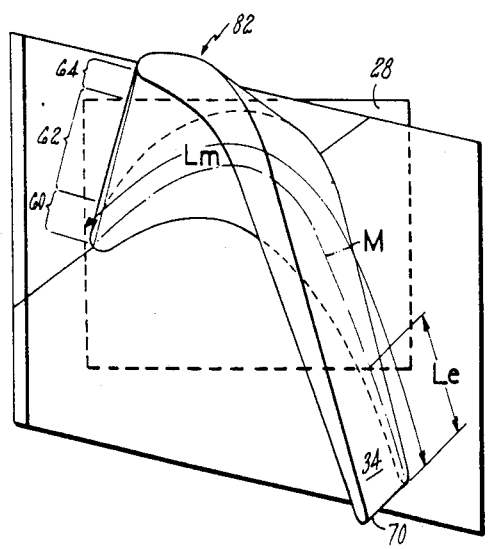
FIG. 4 is a view taken along the lines 4—4 of FIG. 2.

FIG. 4 shows the relationship of the root 28, the platform 36, and the aerodynamic flow directing surface, airfoil 82. Airfoil 82 is formed by the shell 34. In the embodiment shown, the root section 42 of the spar (root 28) extends chordwisely beyond the platform. The shell extends chordwisely beyond the root 28 of the rotor blade. The airfoil in the base region has a mean chord line M having a length $L_m$. The mean chord line extends from the leading edge 68 of the shell to the trailing edge 70. The length of the mean chord line $L_e$ extending beyond the root is over twenty percent (20%) of the length $L_m$ ($L_e \geq 0.20 L_m$).

Figure 5:
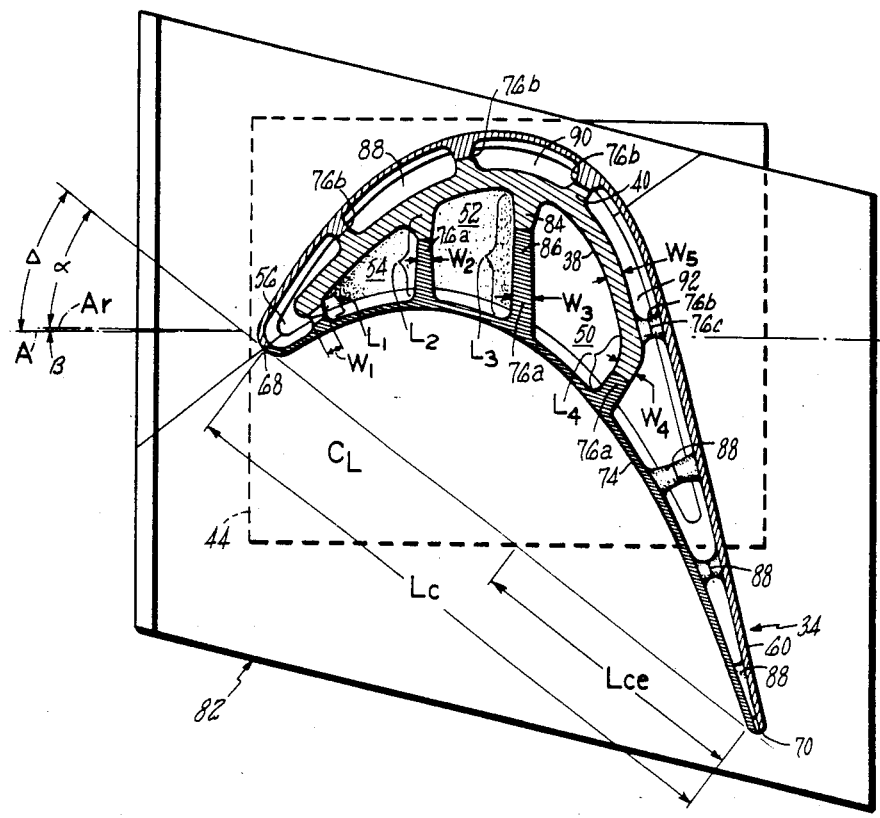
FIG. 5 is a view taken along the lines 5—5 of FIG. 2.

FIG. 5 is a cross-sectional view of the airfoil 82 taken along the lines 5—5 of FIG. 2 showing the base region 60 of the shell 34. The shell, the spar 38 and the ribs 76a bound the cooling air passages 50, 52, 54 and 56 extending from the root of the spar through the airfoil section 40 of the spar. At least one of the ribs 76a includes a first portion 84 formed of the first material and a second portion 86 formed of the second material. The first portion of the rib is integrally formed with the airfoil section of the spar and extends towards the shell. The second portion of the rib is integrally formed with the shell and extends towards the airfoil section of the spar. The second portion of the rib is integrally joined to the first portion of the rib. Alternatively, the first portion of the rib might be integrally joined to the spar and the second portion integrally joined to the shell or a rib formed entirely of one material might extend between the spar and the shell.

The plurality of ribs 76a, the airfoil section 40 of the spar and a portion of the pressure sidewall 74 of the shell form a first hollow beam for resisting gas path loads acting on the airfoil of the blade. The term "plurality of ribs" is used to describe constructions formed of two or more ribs. The ribs in this region of the airfoil extend continuously over most of the span of the airfoil. The ribs extend substantially perpendicular to the axis of rotation of the rotor blade, substantially parallel to the leading edge surface 44 of the root, and have an average length $\overline{L}$ to width $\overline{W}$ which is greater than or equal to three $$\left( \frac{L_1 + L_2 + L_3 + L_4}{W_1 + W_2 + W_3 + W_4} = \frac{\overline{L}}{\overline{W}} \geq 3.0 \right).$$

The width W of the ribs ($W_1$, $W_2$, $W_3$ or $W_4$) is approximately equal to the width $W_5$ of the spar.

The ribs 76b extend between the suction sidewall 72 and the airfoil section 40 of the spar as do the ribs 76a. The ribs 76b are spanwisely continuous over most of the span of the airfoil, bounding the cooling air passages 88, 90, 92 and forming a second hollow beam in cooperation with the airfoil section of the spar. Alternatively, the ribs may be local projections in the form of pedestals, such as pedestals 76c, which are spaced one from the other to place the cooling air passage 92 in flow communication with the trailing edge region of the airfoil.

The portion of the shell 34 which extends chordwisely beyond the root has a plurality of ribs 88 in the form of pedestals. The ribs 88 extend between the suction sidewall and the pressure sidewall and are spaced one from the other to place trailing edge region of the airfoil in flow communication with the working medium flow path 16.

A conical chordline $C_L$ extends between the leading edge 68 and the trailing edge 70 of the shell. The conical chordline lies in a plane which is substantially parallel to the Z-plane of the rotor blade. Viewed from a direction perpendicular to the Z-plane, the conical chordline and the axis of symmetry $A_r$ of the root of the rotor blade in the base region of the shell form an acute angle $\alpha$ which is greater than twenty degrees (20°). In the embodiment shown, the angle is approximately thirty-five degrees (35°). An angle $\beta$ is formed between the axis of symmetry of the root $A_r$ and the axis of rotation of the disk A. An angle $\Delta$ is formed between the conical chordline $C_L$ and the axis of rotation of the disk A. An angle $\Delta$ is formed between the conical chord line $C_L$ and the axis of rotation of disk A. The angle $\Delta$ is the summation of the angle $\alpha$ and the angle $\beta$ ($\Delta = \alpha + \beta$). Because the axis of symmetry of the root $A_r$ is parallel to the axis of rotation A, the angle $\Delta$ is equal to the angle $\alpha$; the angle $\beta$ is equal to zero. For purposes of illustration, a small angle $\beta$ representative of manufacturing tolerances ($\pm 2°$) is shown such that the axis of symmetry of the rotor blade $A_r$ is substantially parallel to the axis of rotation A of the disk and sidewalls of the root are substantially perpendicular to the lending edge or trailing edge surfaces of the root. The length of the conical chord line extending beyond the root of the rotor blade in the base region is $L_{ce}$. The ratio of the length of the extended conical chord line $L_{ce}$ to the length of the conical chord line $L_c$ provides a measure of the extension of the airfoil beyond the root of the rotor blade. In the embodiment shown, the ratio is greater than thirty percent ($L_{ce}/L_c > 30\%$).

FIG. 6 is a partial perspective view of an alternate embodiment of the rotor blade 14 shown in FIG. 3 having a shell 134 which extends over a projection 139 on the spar 138. The shell has a portion 100 extending over the projection on the spar. The shell is attached by welding, brazing, bonding or other suitable method, to the projection on the spar. The platform is attached to the spar by extending over the portion of the shell which is attatched to the projection on the spar. The platform is formed of a ceramic material which is immiscible in the material which forms the shell and which is immiscible in the material which forms the spar. As a result, a mechanical attachment exists between the platform and the spar resulting from the indirect attachment of the platform to the spar through the shell.

The method of making the coolable rotor blade shown in FIG. 3 and in FIG. 5 includes the steps of joining the shell 34, 134 to the airfoil section 40 of the spar 38, 138 and forming a platform about the spar and in the shell such that the platform is attached to the spar 38, 138 and extends over a portion of the shell 134. The shell in the embodiment shown includes a tip cap 66. After the shell is joined to the airfoil section of the spar the tip cap is attached to the shell by bonding, welding, brazing or any other suitable process.

The step of joining the platform to the spar is performed either directly by forming the platform such that it extends between the root section and the shell and over the projection on the spar or indirectly by joining the shell to the spar over the projection on the spar and then forming the platform so that it extends over the projection formed by the shell and the spar. One method of joining the platform to the spar either directly or indirectly includes (before the step of attaching the tip cap) the step of forming the platform of a silicon carbide fiber reinforced ceramic by molding ceramic constituents in powder form to the shape of a platform about the shell and the spar. These constituents are in the glassy state (noncrystalline form) and are combined in powder form with the silicon carbide fibers by hot press consolidation. After densification, the composite is held for a time and at a temperature sufficient to transform the noncrystalline glassy state components into the crystalline ceramic state by controlled nucleation and growth. During this period of time, the temperatures of the process may approach or even exceed two-thousand degrees Fahrenheit (2000° F.). The method includes the step of flowing a cooling fluid through the cooling passages in the spar and through the shell to ensure that the temperature of the spar and shell does not exceed desireable temperatures during the fabrication process. Preferably the temperature of the root of the spar and the shell during the fabrication process is greater than the operative temperature that the root of the spar will encounter during operation. Because of differences in thermal expansion, this will allow the spar to contract more than the platform during cooling leaving a gap therebetween. During operation, the root will expand to decrease the gap, avoiding the imposition of severe expansive stresses on the platform which might occur if an unavoidable mismatch occurs between the coefficient of thermal expansion of the spar material and the platform material.

As will be realized in making the FIG. 3 embodiment, a seal of a ceramic material or other suitable material extends between the shell which is spaced from the root of the rotor blade. This seal is leached out or removed by other well known methods.

After completion of the step of fabricating the platform the tip cap is bonded to the tip of the shell to block the leakage of the cooling air during operation of the rotor blade. A structure results which has structural integrity in the environment of the gas turbine engine. Moreover, in constructions employing a ceramic composite, the density of the platform is much less than the density of platforms formed of a metallic alloy. A decrease in the dead rim weight results.

The ceramic composite and the method of forming the ceramic composite is described in more detail in U.S. Pat. No. 4,324,843 entitled "Continuous Length Silicon Carbide Fiber Reinforced Ceramic Composites" issued to Brennan et al, the information in which is herein expressly incorporated by reference. Alternatively the platform might be cast directly around the shell and the root using a metallic alloy. The metallic alloy and method of casting for either a mechanical or metallurgical attachment is described in more detail in U.S. Pat. No. 4,008,052 entitled "Method for Improving Metallurgical Bond in Bimetallic Castings" issued to Vishnevsky et al, the information in which is herein expressly incorporated by reference.

Cooling the ceramic composite during the fabrication process may result in a small layer of composite which is partially in the glassy and partially in the ceramic state extending between the root and the platform in the FIG. 3 embodiment or extending between the shell and the platform in the FIG. 5 embodiment. Because of the mechanical attachment it is believed that such a layer will not compromise the structural integrity of the rotor assembly during operation.

The platform may be formed at a lower temperature by forming two densified portions of the platform and joining them together by ceramic brazing, ceramic bonding, or a like process. In such a case the portions of the platform are each adapted, as shown in FIG. 5, by a cylindrical hole 104 to receive a cylindrical dowel 106. The dowel is preferably formed of the material from which the platform is made. Methods for composite bonding are also discussed in the following patent applications assigned to applicant's assignee the information in which is herein expressly incorporated by reference: U.S. application Ser. No. 215,282, filed Dec. 12, 1980, issued Oct. 12, 1982 as U.S. Pat. No. 4,353,966; U.S. application Ser. No. 215,283 filed Dec. 12, 1980, issued Sept. 21, 1982 as U.S. Pat. No. 4,350,744; U.S. application Ser. No. 338,824 filed Jan. 11, 1982, issued Aug. 16, 1983 as U.S. Pat. No. 4,398,659; and an application filed by John J. Brennan and Karl M. Prewo on Feb. 5, 1982, U.S. application Ser. No. 345,998, issued Oct. 18, 1983 as U.S. Pat. No. 4,410,635.

During operation of the gas turbine engine, hot, high pressure gases are flowed along the working medium flow path 16. As the gases pass through the rotor assembly 10, the rotor assembly is driven at high speeds about its axis of rotation A. The level of stresses in the disk at the attachment slot of the rotor blade to the disk is proportional to the weight of the blade. The rigid, hollow airfoil 82 comprised of two hollow beams provides a lightweight structure for reduced stresses at the disk and a rigid structure which accepts the forces exerted by the working medium gases. The shell 34 extending chordwisely beyond the root 28 of the rotor blade to overhang the root enables the blade to remove the right amount of work from the incoming flow of hot gases and to redirect the flow to the next array of airfoils in an efficient manner. Heat is transferred from the working medium gases to the rotor blade by reason of the intimate contact between the gases and airfoil. The heat flux is especially large in the thin leading edge region 68 and trailing edge region 70 of the shell and causes differences in thermal growth between the shell and the root. The relative freedom of the shell to grow with respect to the root reduces thermal stresses in the blade at the interface between the root and the shell. The shell 34 transmits the forces exerted by the working medium gases to the disk, causing rotation of the disk. The shell is subjected to rotational forces as the disk rotates about the axis of rotation. Maximum stresses in the edge of the root are reduced as compared with conventional rotor blades by avoiding the transfer of rotational loads on the spar to the trailing edge and the leading edge of the root. Instead, rotational loads on the shell are transferred from the shell to the airfoil section of the spar and thence to a more central region of the spar. Also avoided are stress concentrations resulting from the transition between the long, thin plate of the airfoil 82 and the short, broad plate of the root 28 of the rotor blade in the edge regions. As a result, the weight of the rotor blade may be reduced in this region of the blade.

The reduction of rotational stresses and thermal stresses in the transition between the trailing edge of the airfoil and the root enables the trailing edge to overhang the root and permits an increased angle $\alpha$ between the conical chord line $C_L$ in the base region of the airfoil and the axis of symmetry $A_r$ of the root as compared with conventional constructions. For example, the angle may be greater than twenty degrees. In the embodiment shown, the angle approaches thirty-five degrees (35°). The angle $\Delta$ of the conical chord line $C_L$ to the axis of rotation of the disk A is established by aerodynamic considerations. The increase in the angle $\alpha$ between the conical chord line $C_L$ and the axis of symmetry of the root reduces to zero the angle $\beta$ between the axis of symmetry of the root $A_r$ and the axis of rotation of the disk $A_d$. This results in a zero angle between the slot in the disk and the axis of rotation A of the disk and avoids the stress problems associated with angled slots. A decrease in the maximum stresses results enabling the design of a disk having increased fatigue life or, for the same fatigue life, a decreased size of the disk resulting in a structure having reduced weight. Alternatively, the angle $\beta$ may be increased from zero to reduce stresses in the rotor blade by decreasing angle $\alpha$. Such a design would enhance the fatigue life of the rotor blade. In such a case the axis of symmetry of the root Ar would not be perpendicular to the leading edge or trailing edge surface of the root. The sidewalls of the root would be parallel to the axis of symmetry of the root Ar. Moreover, the relationship with α and β may change to the extent that the base region 60, 160 of the shell 34, 134 does not extend chordwisely beyond the root 42 of the spar. Nevertheless, reduced stresses in the blade will occur because of taking out at least a portion of the rotational loads through the airfoil section 40 of the spar.

Although the invention has been shown and described with respect to detailed embodiments thereof, it should be understood by those skilled in the art that various changes in form and detail thereof may be made without departing from the spirit and the scope of the claimed invention.

We claim:

1. A coolable rotor blade for an axial flow rotary machine which comprises:
   - a spar which extends spanwisely, which has a projection and which has a root section and an airfoil section;
   - a shell for defining the airfoil surface of the rotor blade which extends telescopically over and against a portion of the projection on the spar, which is spaced from the airfoil section of the spar and which is joined to the airfoil section of the spar for defining cooling passages therebetween and for transmitting radial loads acting on the shell to the airfoil section of the spar during operation of the rotor assembly;
   - a platform which extends over the projection on the spar and over and against the portion of the shell extending over the projection on the spar to trap the shell between the platform and the projection on the spar.

2. The coolable rotor blade of claim 1 wherein the spar is formed of a first material, the shell is formed of a second material and the root is formed of a third material.

3. The coolable rotor blade of claim 1 wherein the platform is mechanically attached to the spar.

4. The invention as claimed in claim 1 wherein the root section has a leading edge face and a trailing edge face and wherein the shell has at least two ribs, each rib extending substantially parallel to one of said faces, each rib being attached to the spar and each rib having length l, a width W and a ratio of length to width which is greater than or equal to three (l/W≧3.0).

5. The coolable rotor blade of claim 4 wherein the spar is formed of a first material, the shell is formed of a second material and the root is formed of a third material.

6. The invention as claimed in claim 5 wherein the third material is a multilayer, fiber reinforced ceramic composite.

7. The invention as claimed in claim 6 wherein the first material has a yield strength in tension which is greater than 110,000 pounds per square inch at fifteen hundred degrees Fahrenheit (1500° F.), the second material is a metallic alloy having at least a good resistance to oxidation and the third material is a silicon carbide fiber reinforced ceramic.

* * * * *